United States Patent
Yamazaki

(10) Patent No.: US 11,714,569 B2
(45) Date of Patent: Aug. 1, 2023

(54) STORAGE CONTROLLER, STORAGE DEVICE, AND PROGRAM

(71) Applicant: KIOXIA CORPORATION, Tokyo (JP)

(72) Inventor: Hajime Yamazaki, Kawasaki Kanagawa (JP)

(73) Assignee: KIOXIA CORPORATION, Tokyo (JP)

(*) Notice: Subject to any disclaimer, the term of this patent is extended or adjusted under 35 U.S.C. 154(b) by 346 days.

(21) Appl. No.: 16/803,324

(22) Filed: Feb. 27, 2020

(65) Prior Publication Data

US 2021/0089227 A1  Mar. 25, 2021

(30) Foreign Application Priority Data

Sep. 20, 2019  (JP) .................................. 2019-172185

(51) Int. Cl.
*G06F 3/06* (2006.01)
*G06F 11/30* (2006.01)
*G06F 9/54* (2006.01)
*G06F 11/07* (2006.01)

(52) U.S. Cl.
CPC .......... *G06F 3/0653* (2013.01); *G06F 3/0616* (2013.01); *G06F 3/0652* (2013.01); *G06F 3/0658* (2013.01); *G06F 3/0659* (2013.01); *G06F 3/0679* (2013.01); *G06F 9/542* (2013.01); *G06F 11/0757* (2013.01); *G06F 11/3034* (2013.01); *G06F 11/3058* (2013.01)

(58) Field of Classification Search
CPC . G06F 3/0653; G06F 11/3034; G06F 11/3037
See application file for complete search history.

(56) References Cited

U.S. PATENT DOCUMENTS

| | | | |
|---|---|---|---|
| 7,760,496 | B2 | 7/2010 | Tsukazawa |
| 2012/0033519 | A1 | 2/2012 | Confalonieri et al. |
| 2012/0224425 | A1 | 9/2012 | Fai et al. |
| 2013/0227268 | A1* | 8/2013 | Ichida ............ G06F 9/448 713/100 |
| 2013/0301371 | A1 | 11/2013 | Chen |
| 2016/0092130 | A1 | 3/2016 | Choi et al. |
| 2016/0334992 | A1 | 11/2016 | Yashiro |
| 2020/0210107 | A1* | 7/2020 | Palmer ............ G06F 3/0625 |

FOREIGN PATENT DOCUMENTS

| | | |
|---|---|---|
| CN | 107068185 A | 8/2017 |
| JP | 2013-050818 A | 3/2013 |
| TW | I471868 B | 2/2015 |
| TW | 201541457 A | 11/2015 |
| TW | I540575 B | 7/2016 |

* cited by examiner

*Primary Examiner* — Idriss N Alrobaye
*Assistant Examiner* — Ronald T Modo
(74) *Attorney, Agent, or Firm* — Foley & Lardner LLP

(57) ABSTRACT

According to one embodiment, a storage controller is configured to control a storage device capable of, upon issuance of a predetermined command, causing a storage including a temperature sensor to perform a temperature measurement to update a temperature measurement value. The storage controller includes a timer configured to notify a timeout when an elapsed time from a last issuance of the predetermined command reaches a predetermined time, and a controller configured to, when the timeout is notified, issue to the storage a command for updating the temperature measurement value.

11 Claims, 3 Drawing Sheets

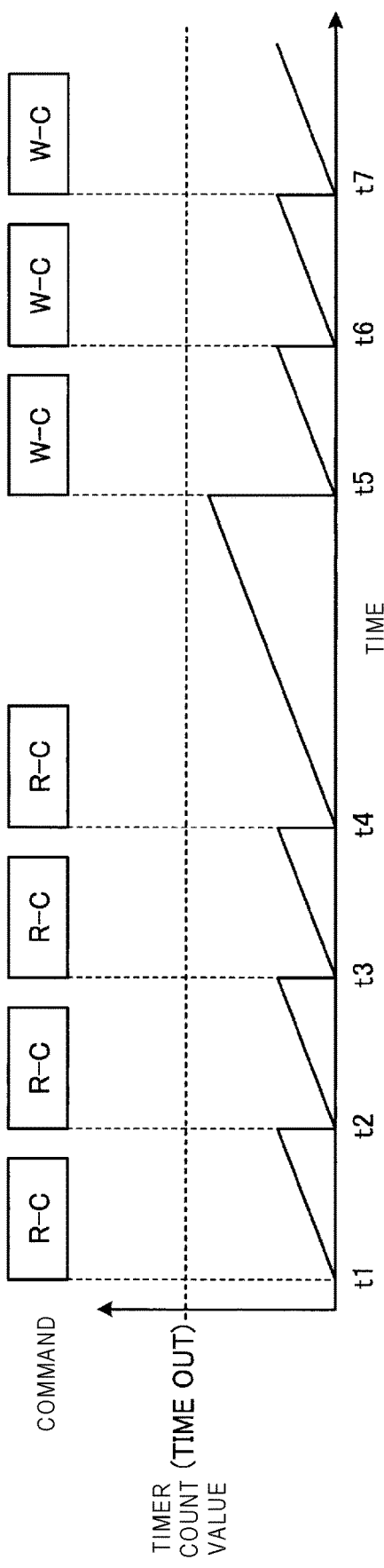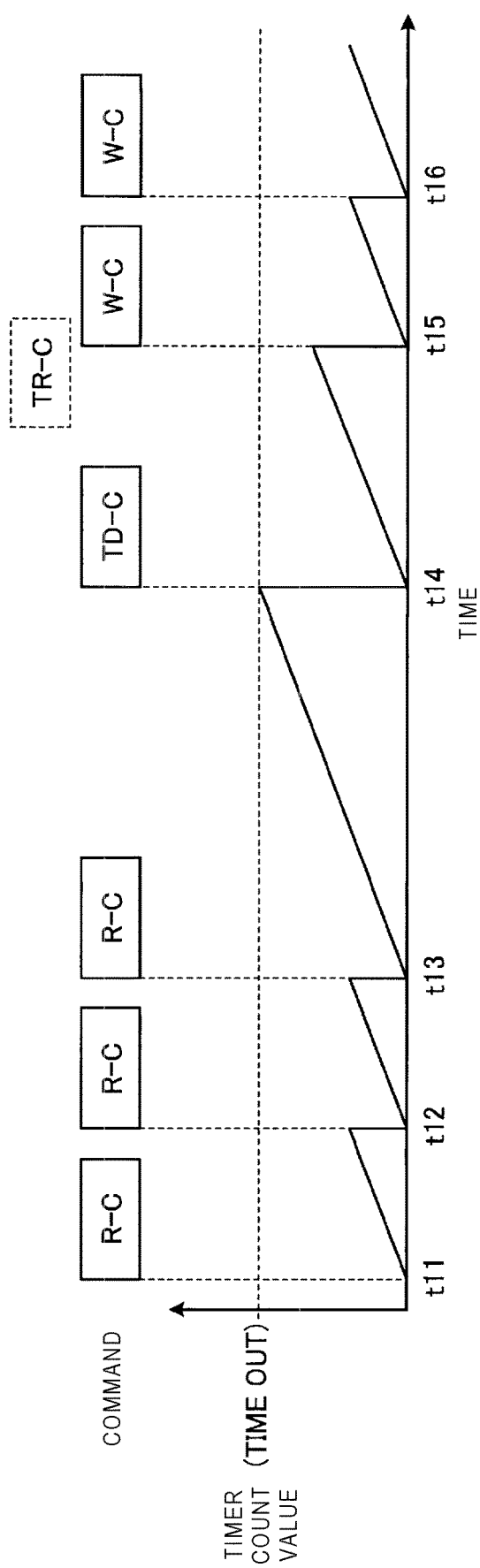

STORAGE CONTROLLER, STORAGE DEVICE, AND PROGRAM

CROSS-REFERENCE TO RELATED APPLICATION(S)

This application claims the benefit of and priority to Japanese Patent Application No. 2019-172185, filed Sep. 20, 2019, the entire contents of which are incorporated herein by reference.

FIELD

Embodiments described herein relate generally to a storage controller, a storage device, and a program.

BACKGROUND

In a storage device, it is necessary to monitor temperature so as not to exceed a guaranteed temperature range of a mounted component. Therefore, a temperature sensor is provided on a substrate of the storage device to measure the temperature. However, a measurement error may occur depending on the distance between a heat source and the temperature sensor.

Further, the temperature sensor provided in a memory chip has a configuration that measures a temperature when a predetermined data access command is input. Therefore, there is a possibility that data access in the storage device may be blocked for a temperature measurement.

DESCRIPTION OF THE DRAWINGS

FIG. 3 is a diagram showing specific operation of the storage device according to the embodiment.

FIG. 4 is a diagram showing another specific operation of the storage device according to the embodiment.

DETAILED DESCRIPTION

An embodiment provides a storage controller, a storage device, and a program that are capable of improving reliability of temperature measurement without blocking data access in the storage device in view of the above.

In general, according to one embodiment, a storage controller may be configured to control a storage device capable of, upon issue of a predetermined command, causing a storage unit (storage or storage device) including a temperature sensor to perform temperature measurement using the temperature sensor so as to update a temperature measurement value. The storage controller may include a timer configured to notify a timeout when an elapsed time from a last issuance timing of the predetermined command reaches a predetermined time, and a control unit (controller) configured to, when the timeout is notified, issue to the storage unit a command for updating the temperature measurement value.

Next, a preferred embodiment will be described with reference to the drawings.

Figure 1:
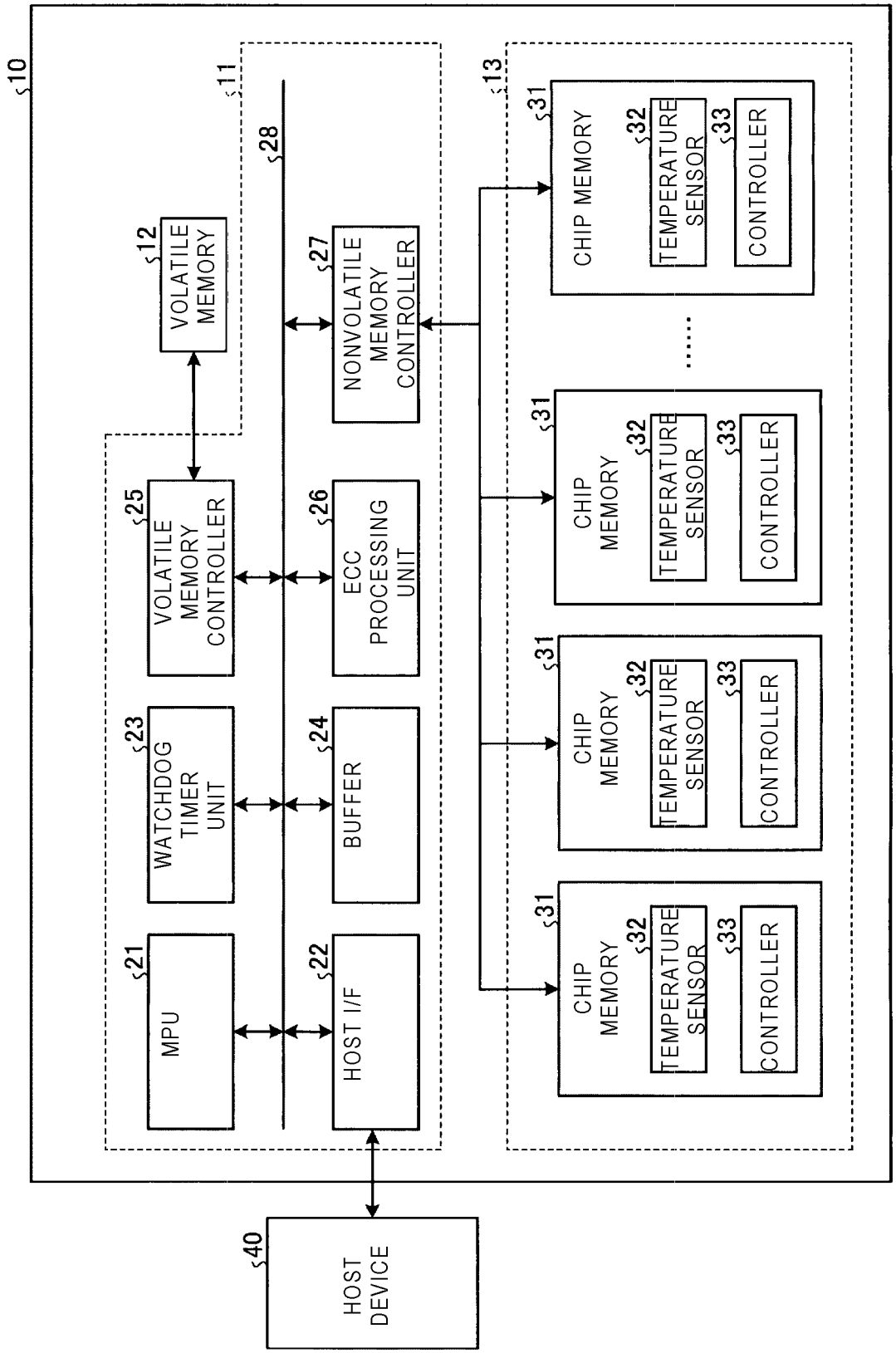
FIG. 1 is a diagram showing an example of a hardware configuration of a storage device according to an embodiment.

FIG. 1 is a diagram showing an example of a hardware configuration of a storage device according to the embodiment.

A storage device 10 may be accessed to read or write data from or to a host device 40 configured as an information processing device such as a personal computer (PC), a workstation, or a server device. The storage device 10 is, for example, a solid state drive (SSD).

The storage device 10 includes a controller 11, a volatile memory 12, and a nonvolatile memory 13.

The controller 11 may control the entire storage device 10. The volatile memory 12 may function as a work area of the controller 11 and the like. The nonvolatile memory 13 stores a program executed by the host device 40, data, a program executed by an MPU 21, and the like.

Next, a detailed configuration of the controller 11 will be described. The controller 11 includes the MPU 21, a host interface (host I/F) 22, a watchdog timer unit 23, a buffer 24, a volatile memory controller 25, an ECC processing unit 26, and a nonvolatile memory controller 27. Each element of the controller 11 may be connected to one another via a communication bus (e.g., a combination of address bus and data bus) 28.

In response to a received write command, the MPU 21 may write data to a storage area of a memory chip 31 indicated by a corresponding physical address. Further, in response to a received read command, the MPU 21 may output data read from the storage area of the memory chip 31.

The host interface (host I/F) 22 may perform communication between the storage device 10 and the host device 40.

The watchdog timer unit 23 (watchdog timer) may include a plurality of timers that time out when temperature measurement of the nonvolatile memory 13 has not been performed for equal to or greater than a predetermined time.

The buffer 24 may temporarily store data received from the host device 40 and data read from the memory chip 31 via the controller 11. The buffer 24 may buffer various data.

The volatile memory controller 25 may control the volatile memory 12.

The ECC processing unit 26 (ECC processor or ECC processing circuitry) may perform error correcting code (ECC) processing. The ECC processing unit 26 may assign an error correcting code (ECC) to write data that is received from the host device 40 via the host I/F 22 and is temporarily stored in the buffer 24. The write data assigned with the error correction code by the ECC processing unit 26 may be written into the nonvolatile memory 13 via the controller 11.

The nonvolatile memory controller 27 may control the nonvolatile memory 13.

Next, a detailed configuration of the nonvolatile memory 13 will be described. The nonvolatile memory 13 includes a plurality of memory chips 31 that can operate in parallel. Each memory chip 31 includes a temperature sensor 32 and a chip controller 33.

The temperature sensor 32 may detect a temperature of the memory chip 31 and output a temperature detection signal. When a predetermined command (mainly a data access command) is input, the chip controller 33 may update detected temperature data based on the temperature detection signal from the temperature sensor 32. The chip controller 33 may output the detected temperature data according to a predetermined temperature read command. The chip controller 33 may include a memory (not shown) such as a RAM and a flash memory that stores the detected temperature data in an updatable manner.

Next, an outline of an operation in which the storage device 10 writes received data to the memory chip 31 will be described.

When the controller 11 of the storage device 10 receives a write command as a data access command including a logical address and write data via the host I/F 22, the controller 11 may cause the buffer 24 to temporarily store the write data. The write data temporarily stored in the buffer 24 may be assigned the error correction code by the ECC processing unit 26. The write data to which the error correction code is assigned may be written into the storage area of the memory chip 31 indicated by the physical address corresponding to the logical address via the nonvolatile memory controller 27. The physical address corresponding to the logical address may be obtained by referring to an address conversion table (not shown) and may be stored in the volatile memory 12.

Next, an outline of an operation of reading data from the memory chip 31 of the storage device 10 will be described.

When the controller 11 of the storage device 10 receives a read command as a data access command including a logical address via the host I/F 22, read data may be read from the storage area of the memory chip 31 indicated by the physical address corresponding to the logical address via the nonvolatile memory controller 27. The physical address corresponding to the logical address may be obtained by referring to the address conversion table (not shown) stored in the volatile memory 12. The controller 11 of the storage device 10 may cause the buffer 24 to temporarily store the read data. The ECC processing unit 26 may examine whether or not an error is present in the read data temporarily stored in the buffer 24. When an error is present, the ECC processing unit 26 may correct the error using the error correction code assigned to the read data, and delete the error correction code. Further, when no error is present, the ECC processing unit 26 may delete the error correction code assigned to the read data. The ECC processing unit 26 may temporarily store the read data from which the error correction code is deleted in the buffer 24. The controller 11 may output the read data from which the error correction code is deleted via the host I/F 22.

As shown in FIG. 1, the ECC processing unit 26 may be implemented as an integrated circuit (hardware circuit or electric circuitry) connected to a bus. However, the ECC processing unit 26 is not limited to this, and may be implemented by a CPU 6 that executes a program.

Figure 2:
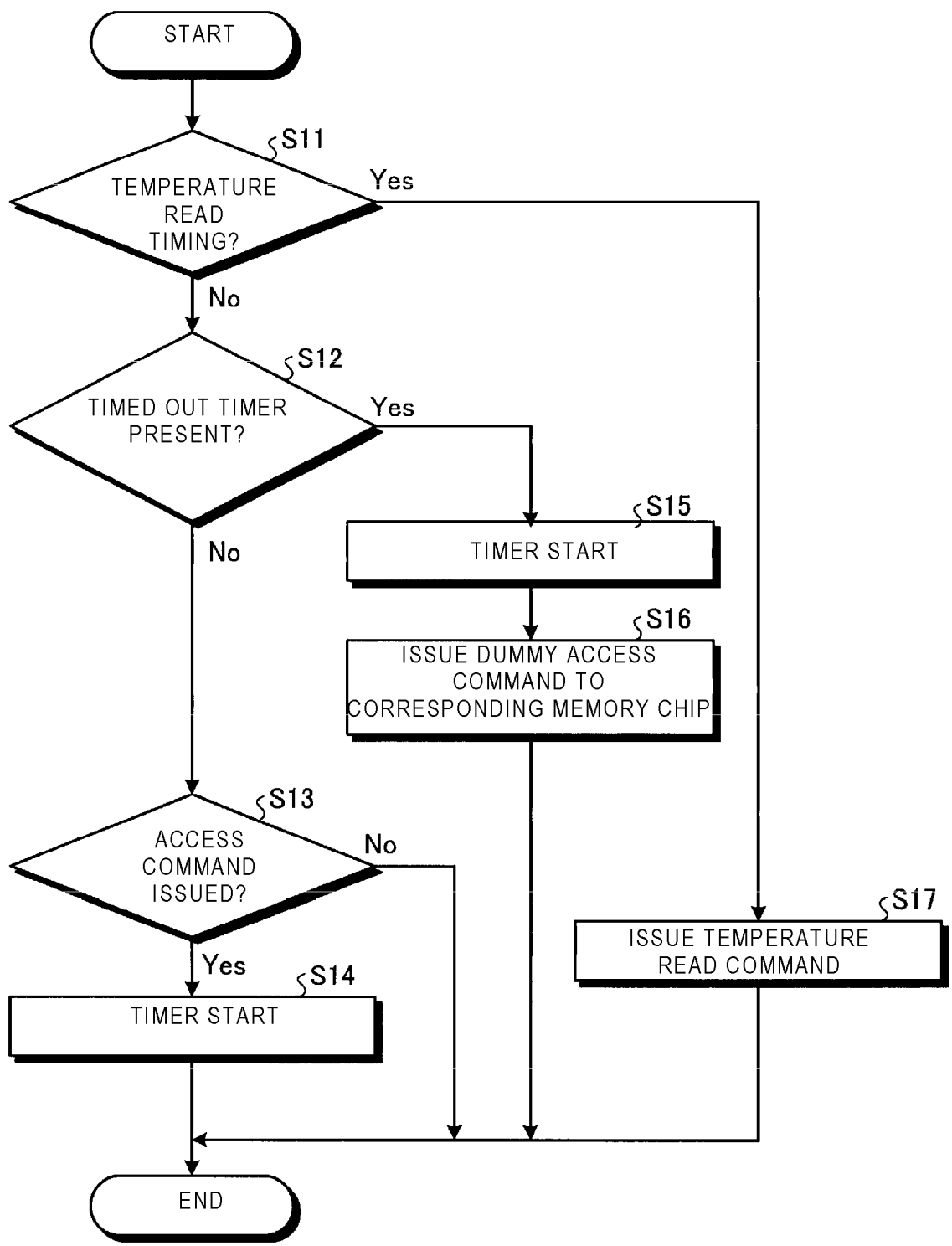
FIG. 2 is a flowchart showing detailed operation of the storage device according to the embodiment.

Next, detailed operation of the storage device 10 according to the embodiment will be described. FIG. 2 is a flowchart showing the detailed operation of the storage device 10 according to the embodiment. It is assumed that all timers constituting the watchdog timer unit 23 are restarted when the storage device 10 is started. Further, the processing shown in FIG. 2 is a processing that is repeatedly performed at intervals of the predetermined time by an interrupt timer.

The MPU 21 of the controller 11 may determine whether or not a current time is a temperature read timing (S11). The current time being the temperature read timing means that a time when the predetermined time has elapsed from the previous temperature read timing is the current time. The previous temperature read timing may be stored in, for example, a nonvolatile memory. When the storage device 10 is started, for example, a first temperature read timing may be set at a time when the predetermined time has elapsed from the start of the storage device 10.

In the determination of S11, when the current time is not the temperature read timing (S11; No), the MPU 21 may determine whether or not a timed out timer is present in the watchdog timer unit 23 (S12).

In the determination of S11, when the current time is the temperature read timing (S11; Yes), the MPU 21 of the controller 11 may send the temperature read command to the memory chip 31 via a NAND controller (S17). Then, the MPU 21 ends the processing (end). When the chip controller 33 receives the temperature read command, the chip controller 33 of the memory chip 31 may read the detected temperature data from the temperature sensor 32. Then, the chip controller 33 of the memory chip 31 may send the detected temperature data to the controller 11.

In the determination of S12, when no timer is timed out (S12; No), the MPU 21 may determine whether or not any of the write command, the read command, or an erase command has been issued as an access command to any one of the memory chips 31 after the previous temperature read timing (S13). When the temperature read timing has not arrived since the start of the storage device 10, it may be determined whether or not any of the write command, the read command, or the erase command has been issued as the access command after the start of the storage device 10.

In the determination of S13, when the MPU 21 has not issued the access command to any of the memory chips 31 (S13; No), the processing may proceed to S11 again.

In the determination of S13, when the access command is issued to any one of the memory chips 31 (S13; Yes), the MPU 21 may restart the timer corresponding to the memory chip 31 receiving the access command (S14). Then, the MPU 21 ends the processing (end).

In the determination of S12, when a timed out timer is present (S12; Yes), the MPU 21 may restart the timer (S15). Then, the MPU 21 may issue a dummy access command as the predetermined command to the chip controller 33 of one or a plurality of memory chips 31 corresponding to the timer (S16). Then, the MPU 21 ends the processing (end). The chip controller 33 of the one or the plurality of the memory chips 31 receiving the dummy access command may update the detected temperature data.

Therefore, all the memory chips 31 can update the detected temperature data at least once within a timeout time of the timer even if the access command is not received.

Here, specific operation of the storage device 10 according to the embodiment will be described. FIG. 3 is a diagram showing specific operation of the storage device 10 according to the embodiment. In FIG. 3, an increase in a count value of one timer constituting the watchdog timer unit is indicated by solid lines in an analog manner. A vertical axis represents a timer count value, and a horizontal axis represents the time. It is assumed that a time difference between a time t4 and a time t5 does not reach the timeout time of the timer.

In the following description, a case will be described in which the MPU 21 issues a read command R-C for reading data from the memory chip 31 and a write command W-C for writing data to the memory chip 31 as the access commands.

As shown in FIG. 3, when the read command R-C is output from the MPU 21 at a time t1, the controller of the memory chip 31 may read and output the corresponding data under control of the nonvolatile memory controller 27. The controller of the memory chip 31 may cause the temperature sensor to update the detected temperature data.

In parallel with this, the MPU 21 may restart the timer of the watchdog timer unit 23 corresponding to the memory chip 31 that is an object of the read command R-C. When the timer is restarted, the count value of the timer may start from 0 and gradually increase.

Then, at a time t2, when the read command R-C is output again from the MPU 21, the controller of the memory chip 31 may cause the temperature sensor to update the detected temperature data. The MPU 21 may restart the timer of the watchdog timer unit 23 corresponding to the memory chip 31 that is an object of the read command R-C. The same may apply to a time t3 and the time t4.

Thereafter, at the time t5, the write command W-C may be output from the MPU 21. Under the control of the nonvolatile memory controller 27, the controller of the memory chip 31 may write data corresponding to the write command W-C and cause the temperature sensor to update the detected temperature data.

In parallel with this, the MPU 21 may restart the timer corresponding to the memory chip 31 that corresponds to the access command in the watchdog timer unit 23. When the timer is restarted, the count value of the timer may start from 0 and gradually increase.

Thereafter, when the write command W-C is output from the MPU 21 at a time t6 and a time t7, the data may be written, the detected temperature data may be updated, and the timer may be restarted in a similar manner.

FIG. 4 is a diagram showing another specific operation of the storage device 10 according to the embodiment. FIG. 4 shows an increase in a count value of one timer of the watchdog timer unit 23 in an analog manner by a solid line. A vertical axis represents a timer count value, and a horizontal axis represents the time. As shown in FIG. 4, when the read command R-C is output from the MPU 21 at a time t11, the controller of the memory chip 31 may read and output the corresponding data under the control of the nonvolatile memory controller 27. The controller of the memory chip 31 may cause the temperature sensor to update the detected temperature data.

In parallel with this, the MPU 21 may restart the timer corresponding to the memory chip 31 that is an object of the read command R-C. When the timer is restarted, the count value of the timer may start from 0 and gradually increase.

Then, at a time t12, when the read command R-C is output again from the MPU 21, the chip controller 33 of the memory chip 31 may update the detected temperature data. The MPU 21 may restart the timer corresponding to the memory chip 31 that is the object of the read command R-C. The same may apply to a time t13.

Thereafter, at a time t14, when the timer restarted at the time t13 times out, the timer may notify the MPU 21 of the case.

When the notification is received, the MPU 21 may restart a timer that is a notification source. When the timer is restarted, the count value of the timer may start from 0 and gradually increase. Subsequently, the MPU 21 may output a detected temperature data update command TD-C as the dummy access command to the chip controller 33 of the memory chip 31 corresponding to the timer of the notification source.

When the detected temperature data update command TD-C is received, the chip controller 33 of the memory chip 31 may update the detected temperature data.

In parallel with this, the MPU 21 may restart the timer corresponding to the memory chip 31. When the timer is restarted, the count value of the timer may start from 0 and gradually increase.

Thereafter, when the write command W-C is output from the MPU 21 at a time t15 and a time t16, the data may be written, the detected temperature data may be updated, and the timer may be restarted.

For a certain memory chip 31, when a time equal to or more than the predetermined time (a time corresponding to the timeout time preset in the timer) has elapsed since a previous issuance of the access command including the update of the detected temperature data, the MPU 21 may issue to the memory chip 31 the dummy access command for causing the chip controller 33 of the memory chip 31 to update the detected temperature data. Accordingly, the detected temperature data can be updated at least at an interval of a time corresponding to the timeout time preset in the watchdog timer.

The MPU 21 can acquire latest detected temperature data by issuing a command that reads the detected temperature data (TR-C) immediately after issuing the dummy access command for causing the chip controller 33 of the memory chip 31 to update the detected temperature data. The read command TR-C can be issued asynchronously with the access command such as data writing, data reading, and data erasing.

According to the storage device 10 of the embodiment, the temperature data detected by the temperature sensor in the memory chip 31 can be updated without unnecessarily blocking data access of the memory chip 31. Further, according to the storage device 10 according to the embodiment, the detected temperature data may be updated at least once within the timeout time of the timer. Accordingly, the reliability of the detected temperature data can be prevented from deteriorating when not updated over a long period of time.

In the above description, an interface standard of the host I/F of the storage device 10 is not described in detail. However, the host I/F can be connected to the host device 40 using an interface standard such as Serial AT Attachment (SATA), Serial Attached SCSI (SAS), and Peripheral Component Interconnect Express (PCIe). In this case, the storage device 10 may be a block storage that accesses data using the logical address (LBA: Logical Block Address), or may be a key-value drive that is connected via Ethernet and accesses variable-length data linked to data with any length, called key.

The storage device 10 is used as an SSD connected to a host such as a server device in, for example, a data center, a cloud system, or a backbone system. The storage device 10 may be an SSD built in an information processing device (for example, the host device 40) in which data such as an operating system (OS) is stored, and may be an external-type SSD connected externally to the information processing device.

Further, a program executed by the MPU 21 of the controller 11 according to the embodiment may be provided by, for example, a file in an installable format or an executable format by being stored in a semiconductor memory device such as a memory card and an solid state drive (SSD) or a computer-readable storage medium such as a digital versatile disk (DVD).

Further, the program executed by the MPU 21 of the controller 11 according to the embodiment may be provided by being stored in a computer connected to a network such as internet and being downloaded via the network. Further, a program executed by the CPU 6 of an SSD controller 3 according to the embodiment may be provided or distributed via the network such as the internet. Further, the program executed by the MPU 21 of the controller 11 according to the embodiment may be provided by being incorporated in advance in a read only memory (ROM) or the like.

Further, the program executed by the MPU 21 of the controller 11 according to the embodiment has a module configuration for implementing each function executed by the MPU 21 on a computer. As actual hardware, the CPU 6 reads a program from a storage device (a DRAM 5 or a NAND flash memory 4) and executes the program, whereby each function is implemented on the storage device 10.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A storage controller configured to control a storage device comprising a non-volatile memory device,
    the non-volatile memory device including a temperature sensor and a memory, wherein the storage controller is configured to:
        issue a first command to cause the non-volatile memory device to perform a process according to the first command, and further to perform a temperature measurement with the temperature sensor to update a temperature measurement value to store the updated temperature measurement value in the memory,
        measure an elapsed time from a last issuance of the first command,
        when the elapsed time reaches a particular time, issue a second command to cause the non-volatile memory device to perform the temperature measurement with the temperature sensor to update the temperature measurement value to store the updated temperature measurement value in the memory, the second command being of a different type from the first command, and
        after an issuance of the first command or an issuance of the second command, issue a third command to cause the non-volatile memory device to send the temperature measurement value stored in the memory to the storage controller.

2. The storage controller according to claim 1, further comprising a timer configured to notify a timeout when the elapsed time reaches the particular time,
    wherein the storage device comprises a plurality of storage units,
    wherein the timer comprises a plurality of timers, wherein a respective one of the plurality of timers is provided in a corresponding one of the plurality of storage units,
    wherein the storage controller is configured to, when the timeout is notified by one of the plurality of timers, issue a command for updating the temperature measurement value to the storage unit corresponding to the one of the plurality of timers.

3. The storage controller according to claim 1,
    wherein the storage device includes a NAND flash memory.

4. The storage controller according to claim 1,
    wherein the first command includes a command for at least one of data writing, data reading, or data erasing.

5. A storage device comprising:
    a non-volatile memory device including a temperature sensor and a memory; and
    a memory controller connected to the non-volatile memory device,
    wherein the memory controller is configured to:
        issue a first command to the non-volatile memory device,
        measure an elapsed time from a last issuance of the first command,
        when the elapsed time reaches a particular time, issue a second command to the non-volatile memory device, the second command being of a different type from the first command, and
        issue a third command to the non-volatile memory device after an issuance of the first command or an issuance of the second command,
    wherein the non-volatile memory device is configured to:
        based on the first command, perform a process according to the first command, and further perform a temperature measurement with the temperature sensor to update a temperature measurement value to store the updated temperature measurement value in the memory, and
        based on the second command, perform the temperature measurement with the temperature sensor to update the temperature measurement value to store the updated temperature measurement value in the memory,
        based on the third command, send the temperature measurement value stored in the memory to the memory controller.

6. The storage device according to claim 5, further comprising a timer configured to notify a timeout when the elapsed time reaches the particular time,
    wherein the storage device comprises a plurality of storage units,
    wherein the timer comprises a plurality of timers, wherein a respective one of the plurality of timers is provided in a corresponding one of the plurality of storage units,
    wherein the memory controller is configured to, when the timeout is notified by one of the plurality of timers, issue a command for updating the temperature measurement value to the storage unit corresponding to the one of the plurality of timers.

7. The storage device according to claim 5,
    wherein the storage device includes a NAND flash memory.

8. The storage device according to claim 5,
    wherein the first command includes a command for at least one of data writing, data reading, or data erasing.

9. A method for controlling a storage device comprising a non-volatile memory device,
    the non-volatile memory device including a temperature sensor and a memory, wherein the method comprises:
        issuing a first command to cause the non-volatile memory device to perform a process according to the first command, and further to perform a temperature measurement with the temperature sensor to update a temperature measurement value to store the updated temperature measurement value in the memory;
        measuring an elapsed time from a last issuance of the first command;
        when the elapsed time reaches a particular time, issuing a second command to cause the non-volatile memory device to perform the temperature measurement with the temperature sensor to update the temperature measurement value to store the updated temperature measurement value in the memory, the second command being of a different type from the first command; and
        after issuing the first command or after issuing the second command, issuing a third command to cause the non-volatile memory device to send the temperature measurement value stored in the memory to a memory controller.

10. The method according to claim 9,
wherein the storage device comprises a plurality of storage units and a timer configured to notify a timeout when the elapsed time reaches the particular time, and the timer comprises a plurality of timers, each provided in a corresponding one of the plurality of storage units,
wherein the method further comprises:
issuing, when the timeout is notified by one of the plurality of timers, a command for updating the temperature measurement value to one of the plurality of storage units corresponding to the one of the plurality of timers.

11. The method according to claim 9,
wherein the first command includes a command for at least one of data writing, data reading, or data erasing.

\* \* \* \* \*